Nov. 24, 1959   J. E. WHEELER   2,914,244
DEPOSITORY DRAWER
Filed Jan. 10, 1958   4 Sheets-Sheet 1
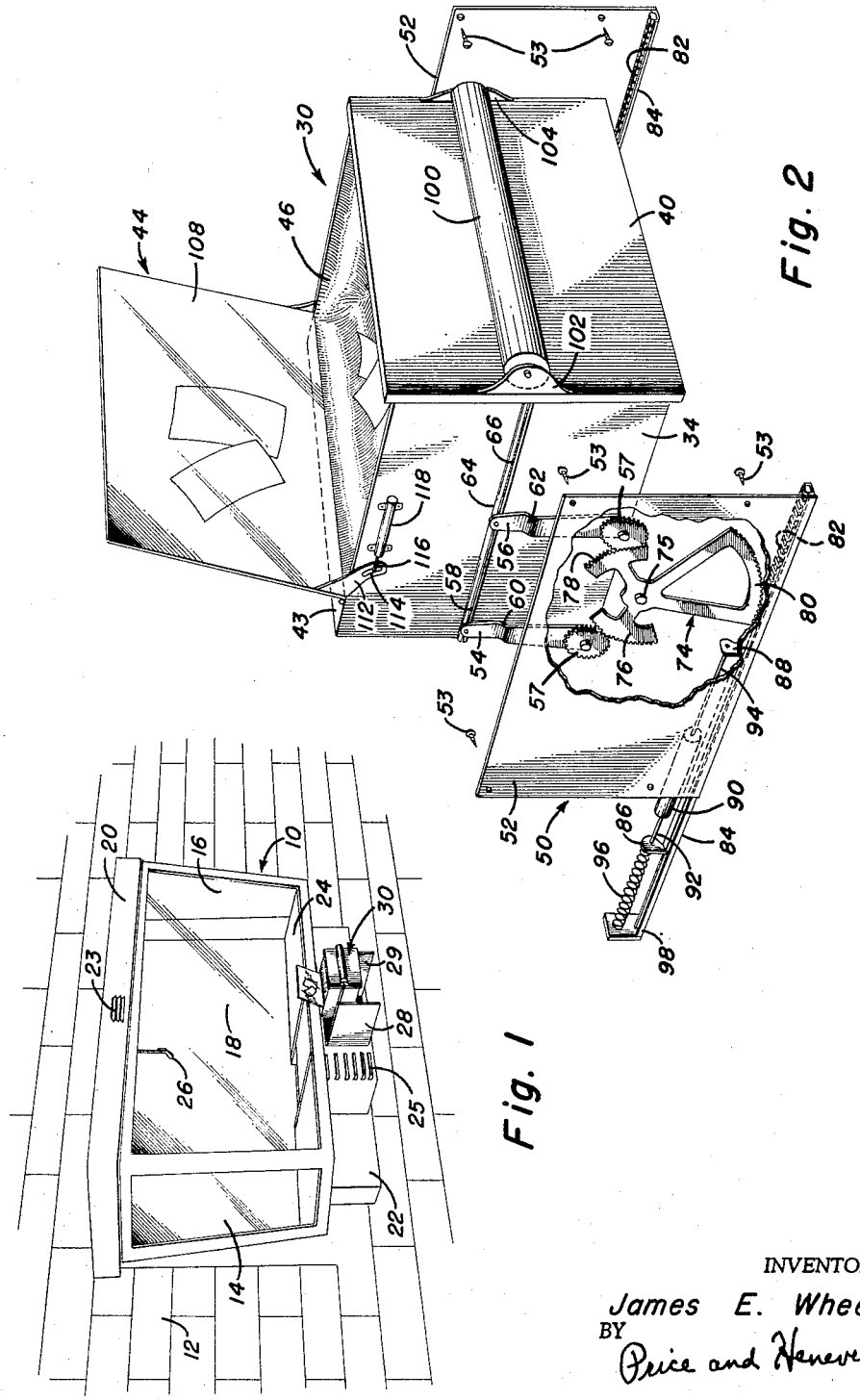
INVENTOR.
James E. Wheeler
BY
Price and Heneveld
ATTORNEYS INVENTOR.
James E. Wheeler
BY
Price and Heneveld
ATTORNEYS Nov. 24, 1959  J. E. WHEELER  2,914,244
DEPOSITORY DRAWER
Filed Jan. 10, 1958  4 Sheets-Sheet 3

INVENTOR.
James E. Wheeler
BY Price and Heneveld
ATTORNEYS

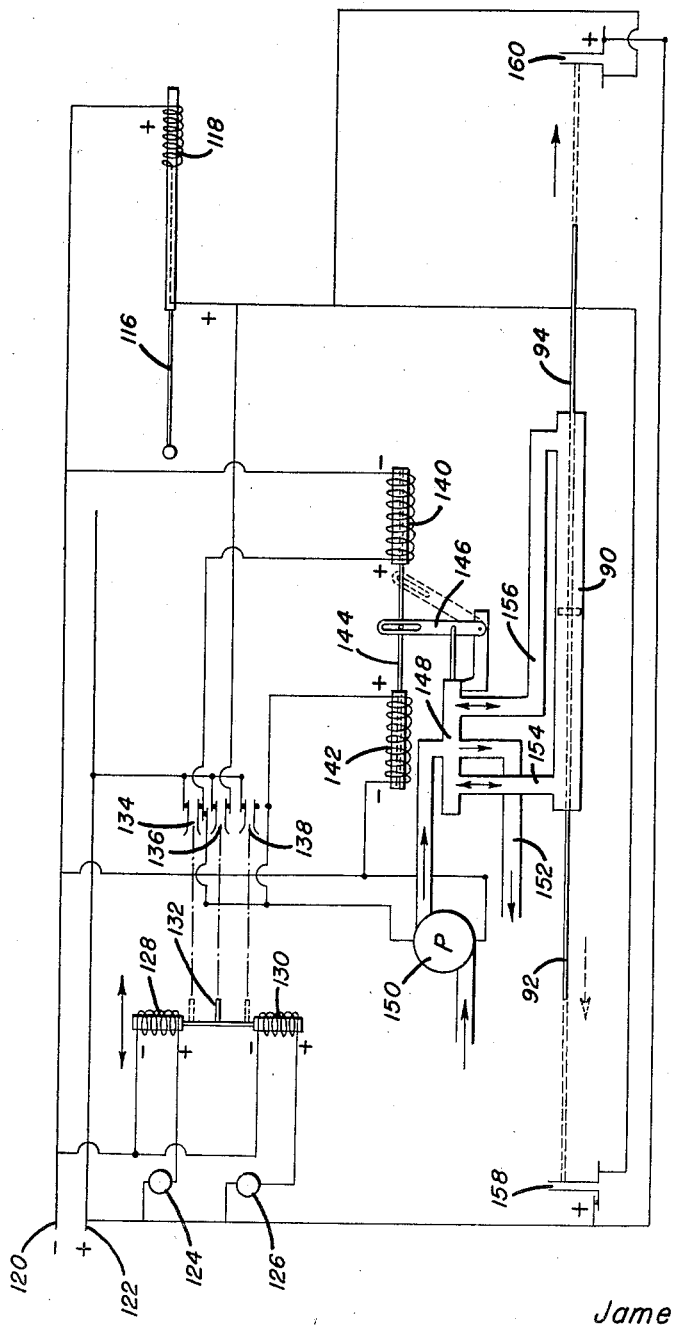

United States Patent Office

2,914,244
Patented Nov. 24, 1959

2,914,244

DEPOSITORY DRAWER

James E. Wheeler, Grand Rapids, Mich.

Application January 10, 1958, Serial No. 708,162

8 Claims. (Cl. 232—44)

This invention relates generally to depository drawers and operating mechanism therefor. More particularly, this invention teaches having depository drawers for drive-in bank teller windows and the like vertically adjustable for different model vehicles and suggests means for accomplishing such vertical adjustable movement.

Bank customers are becoming more prone to using drive-in banking facilities. Such facilities enable a bank customer to make deposits and transact other banking business while remaining seated in an automobile. The conveniences of such drive-in banking service includes eliminating the parking problem, the carrying of heavy coin bags and the like from the car to the bank, and the tiresome standing in line and waiting for service once inside the bank. Drive-in facilities enable quick and personal service for a banking customer while he remains within the comfort, convenience, and protection of his own automotive vehicle.

Drive-in banking facilities generally include a bank teller's window-bay provided on an exterior wall of the bank building and overlooking and facing a driveway for customer's vehicles. The bank teller's window-bay is normally formed and arranged to afford full visibility of the business transaction by both the teller and the customer and likewise to afford both the teller and the customer full visibility of each other.

The teller's window-bay is a protective enclosure for the bank teller and normally includes bullet proof glass. The teller is at all times inexcessible from the outside of the enclosure. Communication between the bank teller and the customer is by means of a two-way communication system and a depository drawer mounted in the bank teller's window-bay. The depository drawer is at all times completely under the control of the bank teller. The drawer is extended or retracted relative to the window-bay in the course of dealing with bank customers.

The depository drawers presently in use in drive-in banking systems, and the like, include a drawer which is horizontally reciprocable. The banking customer is required to locate his vehicle sufficiently near the bank teller's window to enable the drawer to be reached in its extended position. Such depository drawers are limited to simple horizontal movement and are generally designed to accommodate vehicles of average height. In most instances, in order to accommodate both older and newer model vehicles, the drawer proves either too high or too low for one or the other. Furthermore, the height of most drive-in banking depository drawers is exceptionally inconvenient for banking customers in trucks or sports cars.

This invention teaches having a depository drawer selectively adjustable for different vertical heights. The drawer is preferably adjustable in the vertical direction after completing its horizontal travel. This minimizes the drawer housing space required to be provided for in the drive-in banking window.

The specific embodiment of this invention illustrated and hereinafter described enables a combined vertical and horizontal adjustment of a depository or other drawer. The conventional straight horizontal movement is also still available. The disclosed depository drawer includes means for keeping the drawer horizontally disposed during its vertical travel. Means are also provided to prevent forceful extension of the drawer after it is engaged against a motor vehicle.

The means which are taught for making a depository drawer vertically adjustable, and the particular means illustrated for such purposes, may be used to modify present existing depository drawers which are limited to horizontal reciprocable movement. Relatively few parts are required and all are compactly arranged to take a minimum of space. For example, the structure herein described and illustrated may be mounted within the presently existing horizontally reciprocable depository drawer side walls, after removing the bottom and end walls thereof. The installation of this device is relatively simple and can be expediently made.

Aside from the inconvenience of the height of most depository drawers, another notable inconvenience to a banking customer is the absence of a cover member for the depository drawer.

Cover members for depository drawers are necessary to prevent wind and rain from entering the drawer. They would also serve to discourage other unauthorized entry into the drawer. A cover, if provided, would probably not be fully opened by the customer, in order that it could continue to afford some degree of protection against the weather. To enable a drive-in customer to have maximum use of the cover, and accessibility to the depository drawer, it would be preferable to have the cover hinged to the backside of the drawer. However, such an arrangement would obscure the bank teller's vision of the transaction when the cover was opened.

It is most probable that a depository drawer cover, if provided, would be manually operated by the banking customer. This would prove inconvenient in that it would require a customer to use both hands in order to raise the drawer cover and to place the material of his business transaction within the drawer.

The height at which the depository drawer is disposed may also not afford good vision for the banking customer of the interior of the drawer or of the materials that he has placed therein. In most cases a cover would only further obscure the interior of the depository drawer.

The present invention teaches having a drawer cover and one which is automatically raised to a tilted position when the drawer is in its final extended position. The drawer cover is hinged at its back edge to afford maximum accessibility to the drawer for the banking customer. The drawer cover includes a see-through mirror having the reflective surface on the underside of the cover. The tilted disposition of the cover is adapted to enable the banking customer to see the interior of the drawer through the reflection in the mirror surface. At the same time the interior of the drawer and the entire business transaction is visible to the bank teller through the see-through side of the cover member. The interior of the drawer is likewise visible to both the bank teller and the customer when the drawer cover is closed.

The aforementioned and numerous other advantages will be seen to be obtained in the practicing of this invention in accord with the teachings hereinafter set forth as regards a preferred embodiment of this invention.

In the drawings:

Fig. 1 is a perspective view of a drive-in bank teller's window including the depository drawer of this invention.

Fig. 2 is an enlarged perspective view of the drawer supporting and operating mechanism usable in practicing this invention.

Fig. 8 is a schematic illustration of the power system used with the disclosed depository drawer.

Figure 3:
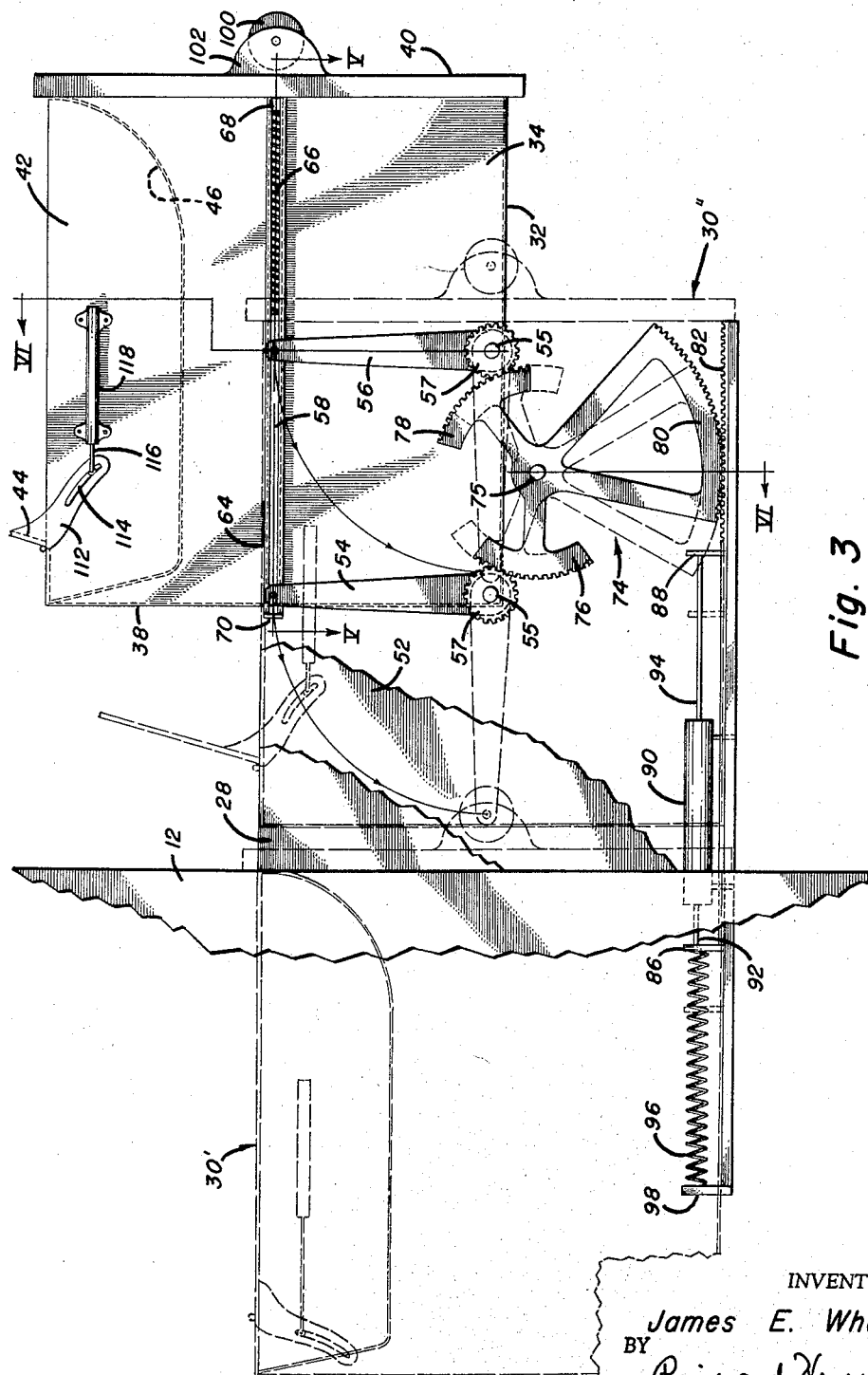
Fig. 3 is a side elevation view of a mechanism for horizontally and vertically adjusting a depository drawer and shows such a drawer in several of its different positions.

Referring to the drawings more specifically, Fig. 1 shows a drive-in window 10 provided in a wall 12 of a building structure. The drive-in window includes two angled sides 14 and 16 and a front wall 18 of glass to afford visibility for a person behind the window enclosure. The glass may be bullet proof, if desired, to afford protection for the cashier or teller. The window areas project from the building wall 12 and are closed by a roof portion 20 and a bottom closure 22. The bottom closure 22 serves as a counter 24, within the window area, and is also adapted to include drawer space and space for electronic and other equipment of the two-way communication system. The communication system includes speaker and receiver outlets 23 and 25 and a microphone 26 within the enclosure.

The particular embodiment of this invention shown and hereafter described is in regard to a depository drawer receptacle and suitable actuating mechanism which may be adapted for use with drive-in window enclosures as they are presently known. Such presently known drive-in enclosures, as mentioned, have a horizontally reciprocable drawer which may be extended or retracted into the bottom enclosure of the window-bay. This is usually accomplished by some form of power mechanism engaged to the drawer. In adapting the disclosed depository drawer receptacle to such an installation the end and bottom walls of such a horizontally reciprocable drawer are removed. This leaves only the side wall portions 28 and 29 shown in Figs. 1 and 7. It is to be assumed that the drawer sides continue to be horizontally operable to extended and retracted positions by some form of conventionally known power mechanism.

The depository drawer receptacle 30 of this invention includes a bottom wall 32, side walls 34 and 36, a back wall 38 and front closing wall 40. The drawer is open at its upper face 42. The back wall 38 of the drawer extends over the open upper portion of the drawer to form a hinge support 43 for a cover member 44. The particular cover member 44 disclosed has several important features which will be described later.

A shallow tray 46 may be disposed within the drawer receptacle 30 and is preferably such as is readily removable. The tray is normally used for paper transactions. However it is removable in order that the drawer may accommodate money bags and larger packages if necessary.

The drawer assembly disclosed includes supporting and actuating mechanism 50 which is shown mounted on panels or plates 52. The mechanism supporting plates are secured to the drawer slides 28 and 29 by fasteners 53 in adapting a conventional depository drawer assembly to include the special features of this invention. A new drive-in window installation might have this mechanism mounted directly on the horizontally reciprocable guide means itself.

The supporting and actuating mechanism 50 employed is the same on both sides of the drawer member 30 and therefore the same numbers are used to designate the same parts. It is understood that the operating mechanism is either synchronized or so adapted that one power actuator may operate both mechanisms in unison.

The operating mechanism includes a pair of arm members 54 and 56. The arm members are mounted to the supporting panels 52 on pivot pins 55. Each arm includes a pinion gear member 57 rotatable therewith on the pivot pin. The other ends of the pivotal arm members are secured together by means of a connecting rod 58. The ends of the arms are offset, as best shown at 60 and 62 in Fig. 5, to enable their pivotal movement, in unison, without interference with each other or other of the operating mechanism to be described.

Figure 4:
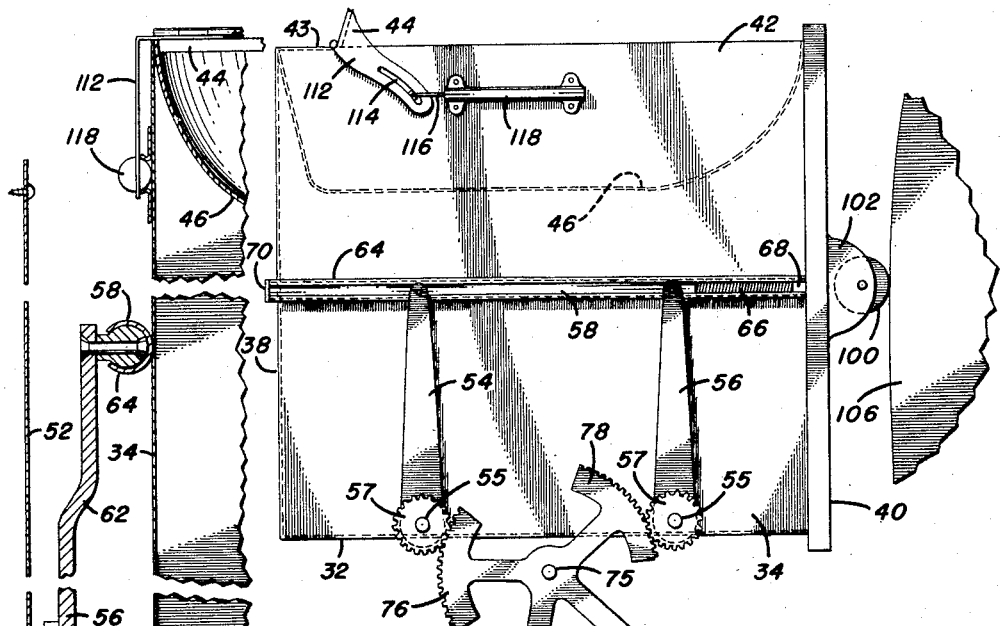
Fig. 4 is a side elevation view of the depository drawer in its vertically elevated position and restrained against further extended horizontal movement.
Figure 5:
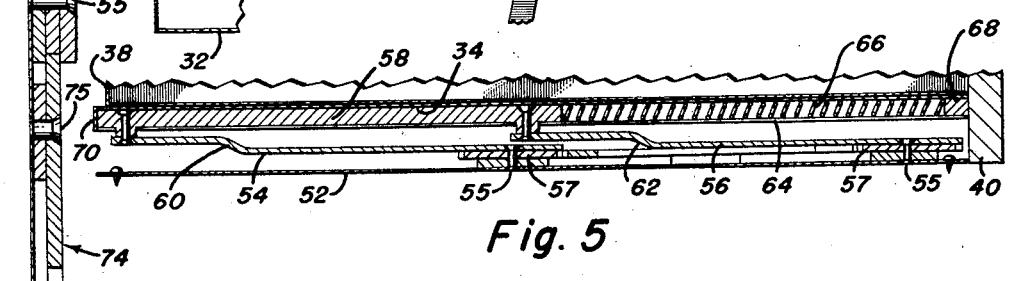
Fig. 5 is a cross sectional view of a part of the depository drawer actuating mechanism as seen in the plane of line V—V of Fig. 3 and looking in the direction of the arrows thereon.
Figures 6, 7:
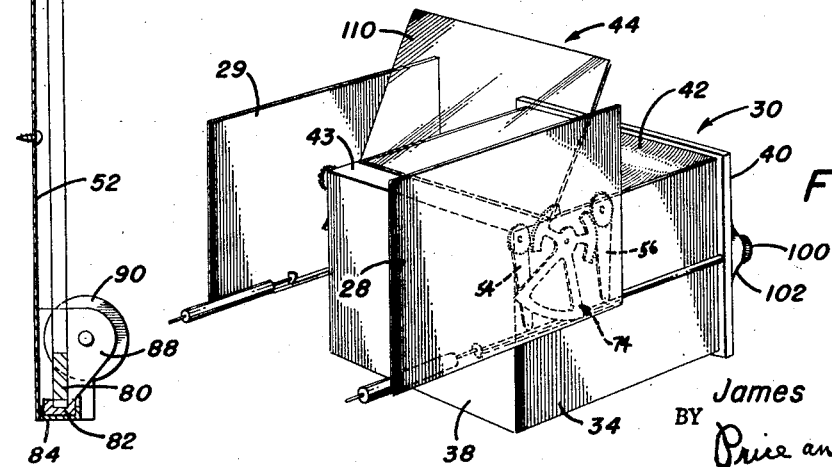
Fig. 6 is a cross sectional view of other parts of the depository drawer actuating mechanism as seen in the plane of line VI—VI of Fig. 3 and looking in the direction of the arrows thereon.
Fig. 7 is a perspective view of the disclosed depository drawer as seen from the bank teller's side of such drawer. Certain drawer operating parts are shown in dotted line for better illustration of this invention.

The arm connecting rod or bar 58 is slidably received within a complementary guide channel 64, best shown in Figs. 4, 5 and 6, and which is secured to the side wall of the depository drawer. The guide member 64 is horizontally disposed on the drawer sides and includes a spring member 66 engaged between the end of the arm connecting tie bar 58 and the front wall face 40 of the drawer. For assembly purposes the guide member 64 may include end closures 68 and 70 as shown.

Spring 66 serves to bias the pivotal arm members 54 and 56 towards the back wall of the drawer for reasons which will later be described.

The mechanism thus far described enables the depository drawer 30 to be vertically raised or lowered, and moved to a forwardly extended position relative to the drawer slides. The parallel spaced disposition of the pivotal arm members 54 and 56, with the connecting tie bar 58 secured therebetween, maintains the open side 42 of the drawer in a continuous horizontal disposition irrespective of the vertical position of the drawer.

The pivotal arm members 54 and 56 are actuated as follows. A gear member 74 is mounted to the support panel 52 on a pivot pin 75 disposed between the pivotal arm members. The gear member includes gear toothed segments 76 and 78 which mesh with the pinion gears 57 of the arms 54 and 56, respectively. Rotation of the gear member 74 causes synchronized rotation of the pivotal arms 54 and 56.

The gear member 74 also includes another gear toothed segment 80 which is engaged by a horizontally reciprocable rack bar 82. The rack bar 82 is slidably disposed and guided within a flanged guide track 84 secured to the bottom edge of the support panel 52. The rack bar includes tabs 86 and 88 engaged and operated by an actuator such as the power cylinder 90.

The power cylinder 90 is a double acting fluid pressure responsive piston cylinder. One piston rod 92 is connected to the rack bar tab 86 and the other piston rod 94 is connected to the other rack bar control tab 88. A counter balancing spring 96 may be used to offset the weight of the depository drawer, if desired, and is engaged between a stop 98 and the guide track and the actuator tab 86.

Actuation of the power cylinder 90 will advance or retract the rack bar 82. The advance or retraction of the rack bar 82 will rotate the gear member 74 in a counter-clockwise or clockwise direction, respectively. The pivotal arms 54 and 56 will be rotated in an opposite direction to that of the gear member 74. Thus the depository drawer 30 may be raised and advanced as shown in Fig. 3; the gear member and pivot arms moving from the dotted to full line positions shown. The drawer would be lowered if the gear member and pivotal arms were caused to move in a direction opposite to that shown and would then be disposed as shown in Fig. 7.

A bumper member 100 is mounted on the front wall face 40 of the drawer member 30, and comprises a roller supported by end brackets 102 and 104 which are secured to the drawer.

Upon engagement of the bumper member 100 with a vertically disposed vehicle body side wall panel 106, as shown by Fig. 4, further forward travel of the drawer is prevented. However, the drawer may continue its vertical travel. The bumper merely rolls up the body panel 106 as the pivot arm members 54 and 56 continue their travel and their connecting link or bar 58 compresses the spring 66. Thus the pivotal and slidable connection of the arm members 54 and 56 to the drawer member 30 enable raising or lowering the drawer to a full vertical position despite any hinderance to its horizontal travel.

The depository drawer assembly 30 also includes a cover member 44 for closing the opening 42 in its upper side. The cover member 44 is shown in Fig. 2 as comprising a see-through mirror having the reflective surface 108 on the underside of the cover. The see-through side 110 of the cover enables full vision of the interior of the drawer, when closed, and in its raised position, as shown in Fig. 7, does not obstruct the vision of the cashier or bank teller.

The cover member 44 includes actuator arms 112 having a cam slot 114 formed therein and receiving the cam follower control rod 116 of an actuator device 118. The cover actuator 118 is secured to the side wall of the drawer member, and will be noted in Fig. 6 to be small enough to occupy the space between the drawer and the panel member 52.

The control means for actuating the drawer 30 and the cover member 44 are schematically illustrated in Fig. 8.

The electrical circuit includes electrical leads 120 and 122 connected to a suitable supply source. Control buttons 124 and 126 are located within the drive-in window enclosure and are adapted to selectively energize solenoids 128 and 130 to actuate a solenoid plunger and locate the contact finger 132 thereof as directed. The solenoid assembly is mounted within the drawer housing from which the drawer is extended. The drawer slides 28 and 29 include three sets of spring finger contacts 134, 136 and 138 disposed to receive the contact finger 132 at the end of the horizontal travel of the depository drawer assembly. The contacts 134, 136 and 138 are each connected to the cover actuator member 118. Contacts 134 and 138 are also connected to the drawer operating cylinder 90. Contact 134 is effective for raising the depository drawer, and contact 138 is adapted to effect a lowering of the depository drawer.

One or the other of the contacts 134, 136 or 138 are engaged by contact 132 during the last half inch of horizontal travel of the drawer slides 28 and 29. This is well after the drawer cover 44 has cleared the outer limits of its housing so that there is no hindrance to the opening of the cover. However, it will be noted that only contact 136 is effective to open the cover member 44 at this time. Contact 136 is engaged when neither a raising or lowering of the drawer 30 has been predesignated.

The contacts 134 and 138 are respectively connected to solenoids 140 and 142. When one of the solenoids 140 or 142 are energized the plunger 144 is adapted to operate a control lever 146 of a four-way valve 148. The valve 148 is connected to a hydraulic pump and motor assembly 150, to a return line 152, and by lines 154 and 156 to opposite ends of the power cylinder 90. The pump assembly 150 is operative, upon energization of one of the contacts 134 or 138 as shown, to circulate the necessary fluid for actuating the power cylinder.

The power cylinder 90 operates the rack bar 82 as previously described, and effects the raising or lowering of the depository drawer 30.

Contacts 158 and 160 are disposed in a position where they will be closed by the power cylinder rods 92 and 94, respectively. The contacts 158 and 160 are closed at the completion of the rack bar travel and consequently when the depository drawer 30 has reached its selected vertical disposition. The closing of either of the contacts 158 or 160 energizes the cover operating power cylinder 118 and the drawer cover 44 is opened.

The power cylinder 118 is adapted to hold the cover 44 in a selected tilted disposition to afford the best visibility of the interior thereof through the mirror surface 108.

By the use of suitable additional electrical controls, such as for controlling the fluid flow control valve 148, selectively energizing or deenergizing the solenoids 140, 142, or 148, or the like, the drawer cover may be lowered, the drawer returned to the level of the drawer slides, and the entire unit retracted within the teller's window unit. It is felt that a circuit for such purpose can be readily devised from the information given and so no illustration or description of means for retracting the drawer is considered necessary to this disclosure.

*Operation*

The depository drawer assembly described is a compact assembly of parts. The supporting and operating mechanism 50 is intended to occupy less than two inches on each side of the depository drawer 30. The structure disclosed is readily adaptable for use within present drive-in windows and may be made in a manner allowing quick and easy modification of the standard type nonadjustable drawer installations now being used.

In a drive-in window including an adjustable depository drawer, as heretofore described, the assembly would be operated and would function as follows.

A bank teller or cashier within the window-bay enclosure 10 would be able to see an approaching vehicle intending to make use of the drive-in facilities. If the vehicle is of average height the depository drawer 30 is selected for normal operation when the vehicle is positioned before the drive-in window. Neither of the control buttons 124 or 126 are actuated. Upon completion of the simple horizontal travel of the drawer 30, on the drawer slides 28 and 29, the contact 132 would be engaged with contact 136. This actuates the cover operating power cylinder 118 and the drawer cover 44 is opened.

If the bank teller or cashier notices that an older model vehicle, or truck, is approaching the drive-in window the control button 124 would be selected for actuation. After the vehicle is located in front of the window bay enclosure button 124 is actuated. This energizes the solenoid 128 and locates the contact finger 132 for engagement with the spring finger contact 134 at the completion of the horizontal travel of the drawer assembly.

Referring to Fig. 3, the depository drawer 30 will travel from the dotted line position 30' to a forwardly extended horizontal position 30''. The drawer in the latter position is beyond the face of its housing enclosure. The drawer is supported in this extended position by the drawer slides 28 and 29, as previously mentioned.

When contacts 132 and 134 are engaged solenoid 142 will be energized and the fluid flow control valve 148 will be operated to admit hydraulic fluid through line 154 to one end of the power cylinder 90. At the same time, the closing of contacts 132 and 134 will actuate the hydraulic pump assembly 150 to pass fluid through line 154 to operate the power cylinder. The piston rod 94 advances the rack bar 82 within its guide track 84. This causes the gear member 74 to rotate in a counterclockwise direction. The gear segments 76 and 78 are in turn rotated counterclockwise and the pinion gears 57, with the pivot arms 54 and 56, are rotated in a clockwise direction.

In the course of pivotal movement of the drawer supporting arms 54 and 56, the depository drawer will be vertically raised to a height equal to the length of the pivotal arm members and will be extended further forward the same distance. If, during this travel, the bumper 100 on the face of the drawer should engage the side wall panel 106 of the automotive vehicle the horizontal movement of the drawer will be stopped. However, the vertical movement of the drawer will continue. The spring member 66, which normally biases the drawer to the maximum forwardly disposed position, will merely be compressed as the pivotal arms 54 and 56 complete their arcuate travel.

Once the drawer has reached its fully adjusted vertical position, the rack bar 82 having completed its travel, the contact 160 is closed and the cover actuating power cylinder 118 is operated. This opens the cover 44 to the tilted position shown and enables easy access to the tray 46 and visibility of the contents of the tray in the reflected surface 108 of the cover member.

If button 126 had been actuated instead of button 124 drawer 30 would have been adjusted to a lowered vertical position as shown by Fig. 7. This figure also shows the clear vision afforded the bank teller or cashier through the see through side 110 of the cover member.

While a preferred embodiment of this invention has been described it will be understood that other modifications and improvements may be made thereto. Such of these modifications and improvements as incorporate the principles of this invention are to be considered as included in the hereinafter appended claims unless these claims by their language expressly state otherwise.

I claim:

1. A depository drawer assembly for use in drive-in service windows and the like, said drawer assembly comprising; a drawer member horizontally reciprocable relative to a housing structure and having an open upper side accessible when said drawer is extended from said housing, means receiving and supporting said drawer member for horizontal and guided reciprocable movement to an extended position wholly outside said housing structure, and operative means provided between said supporting means and said drawer for automatically and appreciably adjusting said drawer as a unit vertically relative to said supporting means from the extended position thereof.

2. A depository drawer assembly for use in drive-in service windows and the like, said drawer assembly comprising; a drawer member horizontally reciprocable relative to a housing structure and having an open upper side accessible when said drawer is extended from said housing, means receiving and supporting said drawer member for horizontal and guided reciprocable movement to an extended position wholly outside said housing structure, pivotal means mounted on said supporting means and engaged with said drawer member, said pivotal means extending towards the back of said drawer in its housed position, and means for rotating said pivotal means when said drawer is extended for vertically and forwardly adjusting said drawer relative to said housing.

3. A depository drawer assembly for use in drive-in service windows and the like, said drawer assembly comprising; a drawer member horizontally reciprocable relative to a housing structure and having an open upper side accessible when said drawer is extended from said housing, means receiving and supporting said drawer member for horizontal and guided reciprocable movement to an extended position wholly outside said housing structure, a see-through cover member disposed to cover and close said open upper side of said drawer and having an opaque mirror surface formed on the underside thereof, means for opening and holding said cover member disposed for visual inspection within said drawer by a person in front thereof via said mirror surface, and operative means provided between said supporting means and said drawer for automatically and appreciably adjusting said drawer as a unit vertically relative to said supporting means from the extended position thereof.

4. A depository drawer assembly for use in drive-in bank teller windows and the like, said drawer assembly comprising; a drawer member having an open upper side, means receiving and supporting said drawer member for guided reciprocable movement, pivotal arm members engaged to said supporting means and having the free ends thereof pivotally and slidably engaged to said drawer member, said arms being adapted to vertically and horizontally adjust said drawer member relative to said supporting member in the course of pivotal movement thereof, and spring means engaged between the front face of said drawer and the ends of said arms for yieldingly biasing said front drawer face in a forwardly disposed position, said drawer being slidably retractable on said pivotal arms at any vertical position thereof.

5. A depository drawer assembly for use in drive-in bank teller windows and the like, said drawer assembly comprising; a drawer member having an open upper side, means receiving and supporting said drawer member for guided reciprocable movement, a pair of pivotal arm members mounted on each of said supporting members and having the free ends thereof pivotally and slidably engaged to opposite sides of said drawer, each arm member of each of said pairs being engaged to said drawer in spaced relation to the other of said pair for holding said drawer in a given horizontal disposition, spring means engaged between the front face of said drawer and the pairs of said pivotal arm members on each side thereof for yieldingly biasing said front drawer face in a forwardly extended position relative to said arm members, and friction reducing means mounted on said front drawer face for engaging a vertically disposed wall interrupting and preventing horizontal adjustment of said drawer and for providing friction free continued vertical adjustment thereof, said drawer being slidably retractable on said pivotal arms in the course of continued vertical adjustment thereof by the compression of said spring means.

6. A depository drawer assembly for use in drive-in bank teller windows and the like, said drawer assembly comprising; a depository drawer having a cover, means for supporting said drawer for horizontal reciprocable movement, a gear sector mounted on said supporting means, a power actuated rack bar operatively engaged with said gear sector, pivotal arm members mounted on said supporting means and each including gear toothed members operatively engaged with said gear sector, means pivotally and slidably engaging the ends of said pivotal arms to said depository drawer, spring means engaged between the ends of said pivotal arms and said drawer for biasing the front of said drawer in a forwardly disposed position relative to the ends of said pivotal arms, power actuated means for raising said drawer cover, operatively disposed switch means on and near the end of said drawer supporting means and on said depository drawer, said switch means being selectively engaged at the end of the horizontal reciprocable travel of said drawer for energizing said rack bar to rotate said gear sector and pivot said arm member for vertically and horizontally adjusting the disposition of said depository drawer relative to said drawer supporting means, and switch means operatively engaged by said power actuated rack bar at the end of its travel for energizing said drawer cover actuating means and raising said cover.

7. A horizontally and vertically adjustable drawer assembly, comprising: a drawer member, means for receiving and supporting said drawer member in a horizontally disposed position, said means including horizontally reciprocable guide means having said drawer secured near the end thereof, vertically adjustable means mounted on said reciprocable guide means and operatively engaged to said drawer member, and an operative interconnection between said reciprocable guide means and said vertically adjustable means preventing the vertical adjustment of said drawer member until said guide means is in a fully extended position.

8. A horizontally and vertically adjustable drawer assembly, comprising: a drawer member, parallel spaced members for receiving and supporting said drawer member between the ends thereof, said members being horizontally reciprocable into and out of a suitable drawer housing, vertically adjustable means securing said drawer member to said horizontally reciprocable members, power actuated means for operating said vertically adjustable means, and an operative interconnection between said reciprocable members and said power actuated means preventing the adjustment of said vertically adjustable means until said reciprocable members have disposed said drawer member in an extended position clear of said drawer housing.

References Cited in the file of this patent

UNITED STATES PATENTS

| | | |
|---|---|---|
| 1,122,746 | Halling | Dec. 29, 1914 |
| 1,647,572 | MacDonald | Nov. 1, 1927 |
| 1,664,517 | Liebl | Apr. 3, 1928 |
| 2,669,343 | Berry | Feb. 16, 1954 |
| 2,730,053 | Ellithorpe | Jan. 10, 1956 |
| 2,739,857 | Fisher | Mar. 27, 1956 |